US009701351B2

(12) United States Patent
Kaufmann et al.

(10) Patent No.: US 9,701,351 B2
(45) Date of Patent: Jul. 11, 2017

(54) ROLLER COLLAR GUARD PLATE

(71) Applicant: Caterpillar Inc., Peoria, IL (US)

(72) Inventors: Gregory J. Kaufmann, Metamora, IL (US); Eric James Johannsen, Washington, IL (US); Mircea Dumitru, Washington, IL (US); Timothy Thorson, Morton, IL (US); Matthew Trone, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/830,081

(22) Filed: Aug. 19, 2015

(65) Prior Publication Data
US 2017/0050686 A1    Feb. 23, 2017

(51) Int. Cl.
*B62D 55/088* (2006.01)
*B62D 55/15* (2006.01)

(52) U.S. Cl.
CPC ........... *B62D 55/088* (2013.01); *B62D 55/15* (2013.01)

(58) Field of Classification Search
CPC ...... B62D 55/088; B62D 55/14; B62D 55/15; A01B 29/06
See application file for complete search history.

(56) References Cited

U.S. PATENT DOCUMENTS

| 3,180,648 A | * | 4/1965 | Kupfert | B24B 5/01 277/382 |
|---|---|---|---|---|
| 3,744,860 A | * | 7/1973 | Casey | B62D 55/15 384/385 |
| 3,843,214 A | * | 10/1974 | Piepho | B62D 55/15 305/119 |
| 4,049,308 A | | 9/1977 | Martin | |
| 5,527,046 A | * | 6/1996 | Bedford | F16J 15/344 277/381 |
| 6,874,859 B1 | * | 4/2005 | Duse | B62D 55/15 305/136 |
| 7,452,134 B2 | | 11/2008 | Burner et al. | |
| 8,075,068 B2 | | 12/2011 | VanderVeen | |
| 8,356,680 B2 | | 1/2013 | Jackson | |
| 8,607,904 B2 | * | 12/2013 | Fukumoto | B62D 49/0635 180/9.21 |
| 2011/0121643 A1 | * | 5/2011 | Mulligan | B62D 55/15 305/136 |
| 2012/0267943 A1 | | 10/2012 | Romanov | |
| 2014/0125116 A1 | * | 5/2014 | Weeks | B62D 55/20 305/100 |
| 2014/0125117 A1 | | 5/2014 | Weeks et al. | |
| 2014/0203519 A1 | | 7/2014 | Kumar Gaurav et al. | |
| 2015/0284042 A1 | * | 10/2015 | Kalmes | B62D 55/088 305/107 |

\* cited by examiner

*Primary Examiner* — Kip T Kotter
(74) *Attorney, Agent, or Firm* — Miller, Matthias & Hull; William R. Tinker

(57) ABSTRACT

A construction machine includes a chassis, at least one continuous track supporting the chassis, at least one rim operatively associated with the continuous track, a shaft rotatably associated with the rim, and a collar operatively associated with the shaft and a guard plate. The collar has a variably angled face interfacing with the rim, and a labyrinth is formed between the collar and the rim via the variably angled face.

17 Claims, 6 Drawing Sheets

ROLLER COLLAR GUARD PLATE

FIELD OF THE DISCLOSURE

The present disclosure relates generally to machines and, more particularly, to construction machines equipped with continuous tracks used for propulsion.

BACKGROUND OF THE DISCLOSURE

Construction and earth-moving machines are often propelled by continuous tracks. Such machines may be used to move materials such as soil, rock, gravel, sand, asphalt, and the like during the construction or maintenance of paved surfaces, building sites, landscapes, mines, or other areas. For example, track type tractors and excavators propelled by continuous track may be used to excavate earth, transport earth and/or building materials, smooth and grade surfaces, and demolish old structures. Typically, such machines include a chassis which supports an engine and an operator cab. An undercarriage supports the chassis and includes a pair of continuous tracks propelled by drive wheels and supported by undercarriage track rollers. The undercarriage track rollers may include a shaft, a rim that turns relative to the shaft and directs continuous track, and a collar that retains the roller on the shaft via internal seals.

During a work cycle, an undercarriage track roller may become fouled with soil, rocks, pebbles, and other debris from the worksite. For instance, an undercarriage track roller may be configured so that debris may become packed between the rim and the collar. Such debris may eventually damage the internal seals, thereby jamming the undercarriage track roller. This situation requires stopping work, removing the undercarriage track roller from the machine, and disassembling the undercarriage track roller to clean out the packed debris and repair the internal seals. Otherwise, the undercarriage track roller may be monitored and preventively removed from the machine and disassembled to unpack the accumulated debris before the internal seals are damaged. A jammed undercarriage roller may also result in damage to the continuous track and propulsion system of the machine.

Undercarriage track rollers that attempt to prevent fouling are available. Such undercarriage track rollers are often arranged with a tight spacing between the collar and the rim meant to keep debris away from the internal seals. More specifically, the collar and the rim are equipped with corresponding labyrinthine structures to impede the ingress of debris while allowing the rim to rotate relative to the collar. However, these efforts to prevent undercarriage track roller fouling have been largely ineffective. It has been found that fine particles of debris have a tendency to enter the space between the rim and the collar despite the tight labyrinthine spacing. Then, because of the tight labyrinthine spacing, these fine particles cannot escape. The fine particles therefore accumulate between the collar and the rim, leading to the aforementioned packing and eventual damage. One example of an existing strategy for attempting to prevent undercarriage track roller fouling is shown by Jackson in U.S. Pat. No. 8,356,680.

It can therefore be seen that improvements in the arrangement of the rim, collar, and associated structures are desired to reduce complexity while still preventing fouling of the undercarriage track roller. Furthermore, reduced complexity may improve reliability, increase assembly efficiency, and reduce cost.

SUMMARY OF THE DISCLOSURE

In accordance with one embodiment, an undercarriage track roller for a construction machine is disclosed. The undercarriage track roller may include a shaft, a rim, a collar, and a guard plate. The collar may be operatively associated with the shaft and with the guard plate. The rim may be rotatably associated with the shaft and may interface with the collar to form a labyrinth between the collar and the rim that is at least partially overshadowed by the guard plate.

In accordance with another embodiment, a construction machine having at least one continuous track is disclosed. The machine may include a chassis, at least one continuous track supporting the chassis, and at least one undercarriage track roller supporting the continuous track. The undercarriage track roller may include at least one rim operatively associated with the at least one continuous track, a shaft rotatably associated with the rim, and a collar operatively associated with the shaft and a guard plate. The collar may have a variably angled face that interfaces with the rim, thereby forming a labyrinth between the collar and the rim. The labyrinth may be at least partially overshadowed by the guard plate.

In accordance with yet another embodiment, a method for preventing debris packing in an undercarriage track roller is disclosed. The method may include configuring the undercarriage track roller to have a collar, a rim, a shaft, and a guard plate. The method may also include operatively associating the collar with the guard plate and the shaft. The method may further include rotatably associating the rim on the shaft such that the rim interfaces with the collar to form a labyrinth between the rim and the collar that is at least partially overshadowed by the guard plate. The method may even further include allowing debris to fall through the labyrinth.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Figure 1:
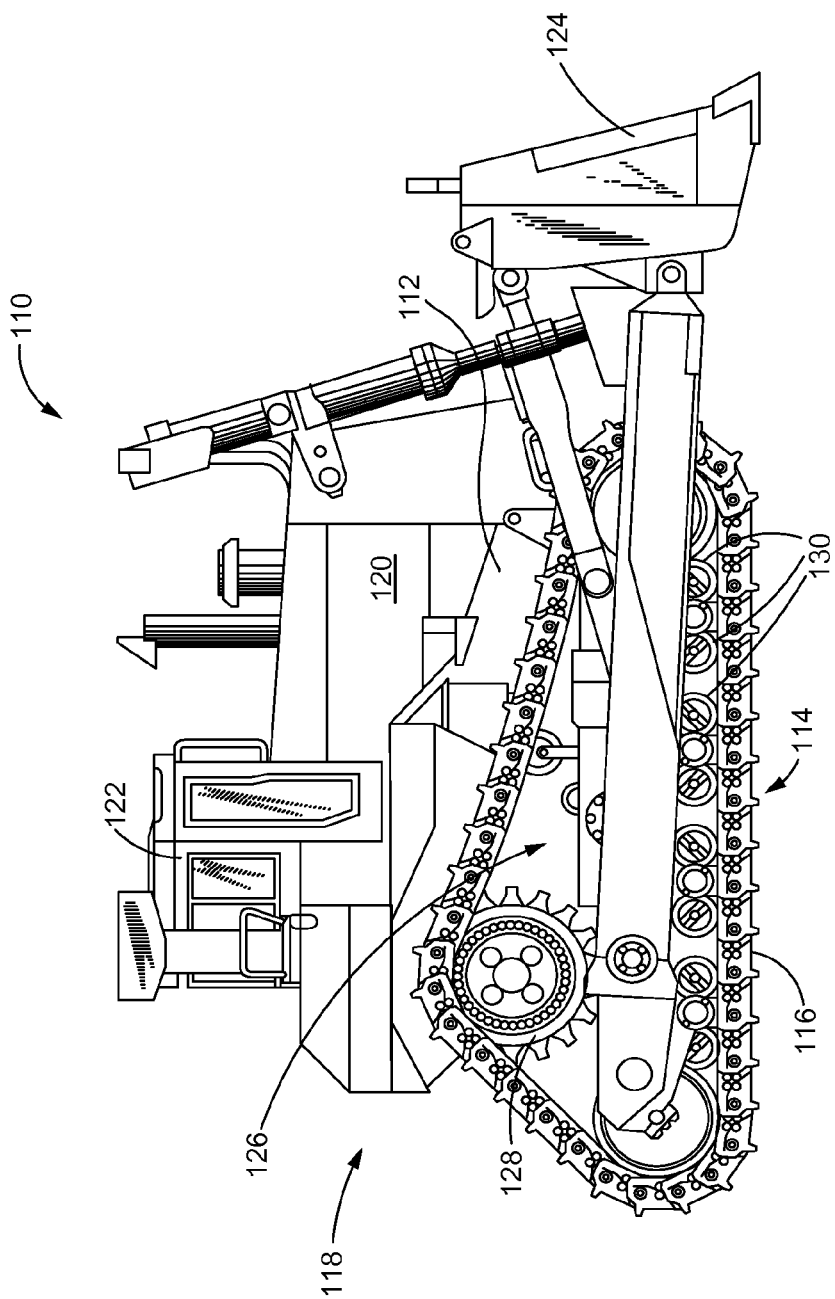
FIG. 1 is a side view of a machine, in accordance with an embodiment of the present disclosure.

Referring now to the drawings and with specific reference to FIG. 1, a machine consistent with certain embodiments of the present disclosure is generally referred to by reference numeral 110. It is to be understood that although the machine is depicted in FIG. 1 as a track type tractor, the teaching of the present disclosure can be employed with equal efficacy in connection with many other types of machines used in construction and earth moving applications including but not limited to excavators, bulldozers, graders, pipelayers, and the like.

The machine 110 may include a chassis 112 supported by continuous tracks 114. Typically, first and second tracks 116, 118 laterally flank the chassis 112 but other numbers of tracks are possible. The chassis 112 may support an engine 120, an operator station 122, and a work implement 124. In the depicted embodiment, a bulldozer blade and support arms are provided as implement 124, but it is to be understood that other implements such as, but not limited to, augers, fork lifts, excavators, and the like are possible. The chassis 112 is itself supported by an undercarriage 126. The undercarriage 126 may include at least one drive wheel 128 and at least one undercarriage track roller 130 which are circumscribed by the continuous track 114. The drive wheel 128 may be drivably connected to the continuous track 114 so as to provide propulsion thereto. The undercarriage track rollers 130 may serve to support and guide the continuous track 114 in a continuous loop. The supporting and guiding structures of the undercarriage track roller 130 are described more fully in conjunction with FIGS. 2 and 3 below.

Figure 2:
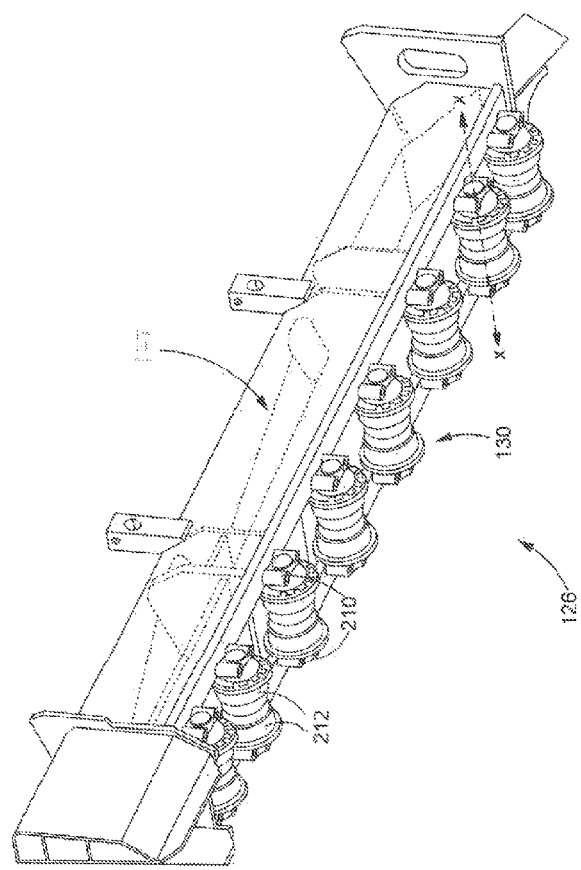
FIG. 2 is a perspective view of an undercarriage assembly of the machine, in accordance with an embodiment of the present disclosure.

Looking at FIG. 2, a conventional track roller frame 127 may be operatively associated with a plurality of undercarriage track rollers 130 which may each include at least one collar 210 and at least one rim 212. The collars 210 may serve to operatively associate the undercarriage track rollers 130 with the track roller frame 127 and the rims 212 may work together to support and guide the continuous tracks 114. The supporting structures and connections between the collars 210 and the rims 212 are more fully described by FIG. 3 below.

Figure 3:
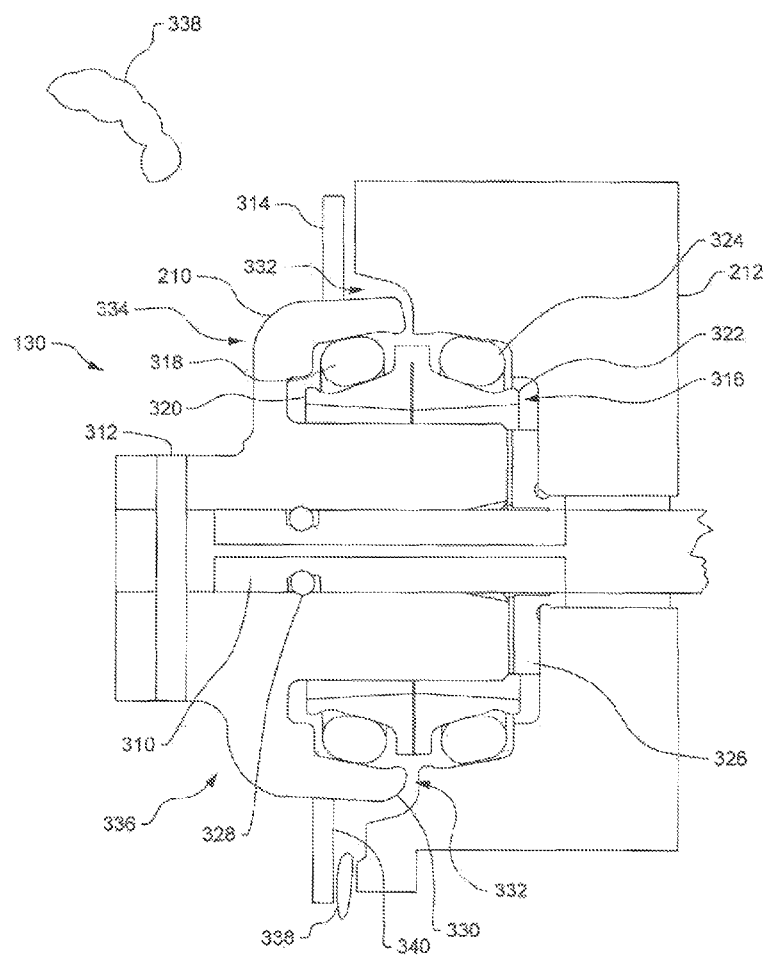
FIG. 3. is a cross-sectional view of an undercarriage track roller of the machine along line X-X of FIG. 2, in accordance with an embodiment of the present disclosure.

Turning to FIG. 3, the undercarriage track roller 130 may also include a shaft 310, a dowel 312, a guard plate 314, and a dual-cone seal 316. The rim 212 may be rotatably associated with the shaft 310 and to support the continuous track 114. The shaft 310 may be operatively associated with the collar 210 and the dowel 312 which may retain the collar 210 on the shaft 310. The collar 210 may be further operatively associated with the guard plate 314 and the dual-cone seal 316 which may in turn be operatively associated with the rim 212.

More specifically, the dual-cone seal 316 may include a first annular elastomer 318 between the collar 210 and a first cone 320, a second cone 322 rotatably associated with the first cone 320, and a second annular elastomer 324 between the second cone 322 and the rim 212.

The undercarriage track roller 130 may further include a bearing 326 and a third annular elastomer 328. The bearing 326 may be rotatably associated with the shaft 310 and the rim 212. Additionally, the bearing 326 may be configured to be disposed between the rim 212 and the collar 210. The collar 210 may also be in contact with the third annular elastomer 328 disposed between the collar 210 and the shaft 310.

Focusing on the collar 210, it may feature a variably angled face 330 that may interface with the rim 212 to form a labyrinth 332 and may be configured such that the variably angled face 330 is closer to the rim 212 along a top portion 334 of the collar 210 than a bottom portion 336. Put another way, the variably angled face 330 may be configured so as to make the labyrinth 332 larger along the bottom portion 336 than along the top portion 334. The labyrinth 332 may be at least partially overshadowed by the guard plate 314 and may work with the guard plate 314 to keep large particles of debris 338 away from the dual-cone seal 316 while allowing small particles of debris 338 to fall around the dual-cone seal 316 and escape through the labyrinth 332. In this manner, the debris 338 may thereby be prevented from packing inside the undercarriage track roller 130. An inner face 340 of the guard plate 314 may interface with the rim 212 and may have additional packing preventative features, the importance of which will be described in further detail below and by FIGS. 4-6

Figure 4:
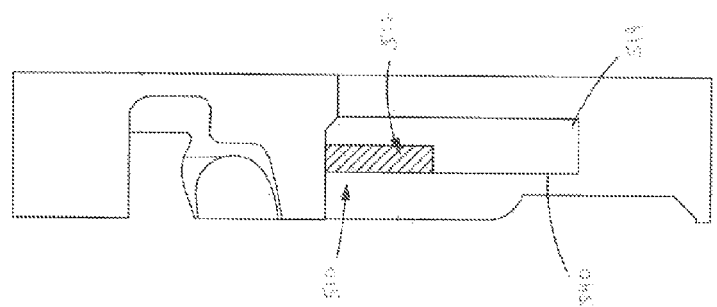
FIG. 4 is an enlarged cross-sectional view of an undercarriage track roller of the machine in accordance with another embodiment of the present disclosure.
Figure 5:
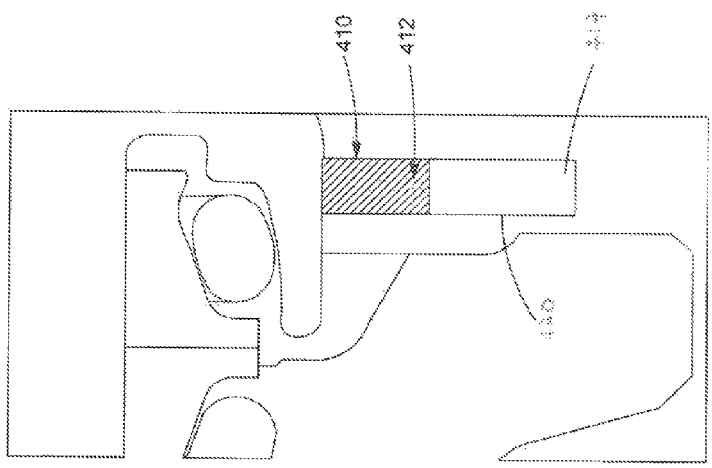
FIG. 5 is another cross-sectional view of an undercarriage track roller of the machine in accordance with another embodiment of the present disclosure.
Figure 6:
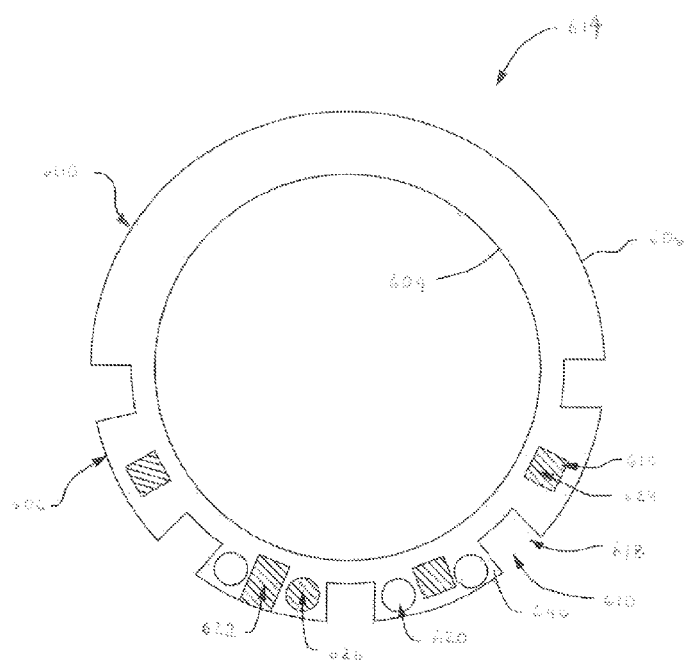
FIG. 6. is an end view of a guard plate of the undercarriage track roller of the machine, in accordance with an embodiment of the present disclosure.

Referring to FIGS. 4 and 5, the guard plate 414, 514 of the undercarriage track roller 130 is shown to include additional structures that may aid in allowing small particles of debris 338 to escape the undercarriage track roller 130 via the labyrinth 332. As shown in both FIGS. 4 and 5, the guard plate 414, 514 may include the inner face 440, 540 and at least one void 410, 510, respectively. In some embodiments, as illustrated in FIG. 4, voids 410 may be formed as gaps 412 through the guard plate 414. In other embodiments, as illustrated in FIG. 5, voids 510 may be formed as recesses 516 in the guard plate 514. In yet other embodiments, the voids 610 may be a combination of recesses 622, 624, 626 and gaps 618, 620, as shown in FIG. 6. It should be understood that the voids 610 may be a combination of any number of recesses 622, 624, 626 with any number of gaps 618, 620, the arrangement and operation of which will be described below and by FIG. 6.

Referring to FIG. 6, the guard plate 614 may further include an upper portion 600, a lower portion 602, an inner perimeter 604 and an outer perimeter 606. As a non-exhaustive example, the guard plate 614 may be annular, as shown in FIG. 6, though it also may be formed in any convenient shape.

In some embodiments, the guard plate 614 may be integral with the collar 210. In other embodiments, the guard plate 614 may be separately manufactured and then operatively associated with the collar 210 via the inner perimeter 604. In further embodiments, the voids 610 featured by the inner face 640 of the guard plate 614 may be along the lower portion 602. These voids 610 may aid in preventing the undercarriage track roller 130 from becoming packed with debris 338 by allowing small particles of debris 338 to rapidly escape after falling through the labyrinth 332, shown in FIG. 3. The solid upper portion 600 of the guard plate 614 may complement the lower portion 602 by keeping large particles of debris 338 out of the labyrinth 332 along the top portion 334. It should be understood that the voids 610 formed as recesses 622, 624, 626 may be any shape besides or in addition to the rectilinear and circular forms shown in FIG. 6, including, but not limited to, ovular, polygonal, and the like. It also should be understood that the voids 610 formed as gaps 618, 620 may be any shape besides or in addition to the rectilinear and circular forms shown in FIG. 6, including, but not limited to ovular, polygonal, and the like.

In some embodiments, the voids 410 may be along the outer perimeter 616. In other embodiments, the voids 410 may be bounded in the inner face 340. In yet other embodiments, the guard plate 314 may feature a combination of voids 410 along the outer perimeter 616 and voids 410 bounded in the inner face 340, as illustrated in FIG. 6.

INDUSTRIAL APPLICABILITY

In operation, the foregoing disclosure finds utility in various industrial applications, such as, but not limited to, construction, road building, agriculture, mining, demolition, excavation, and transportation. In particular, the disclosed construction machine undercarriage track roller may be applied to construction equipment and any other machine equipped with a continuous track propulsion system. By using the disclosed machine and associated undercarriage track roller, operators may run such machines without an undercarriage track roller becoming fouled with debris, jamming, and causing a work stoppage. Furthermore, damage to other components of the machine resulting from a jammed undercarriage track roller may be prevented. Moreover, the passive packing prevention structures of the collar and the guard plate reduce internal complexity of the undercarriage track roller and may increase reliability and shorten maintenance procedures. The disclosed machine and undercarriage track roller may thus provide safety and cost saving measures.

Figure 7:
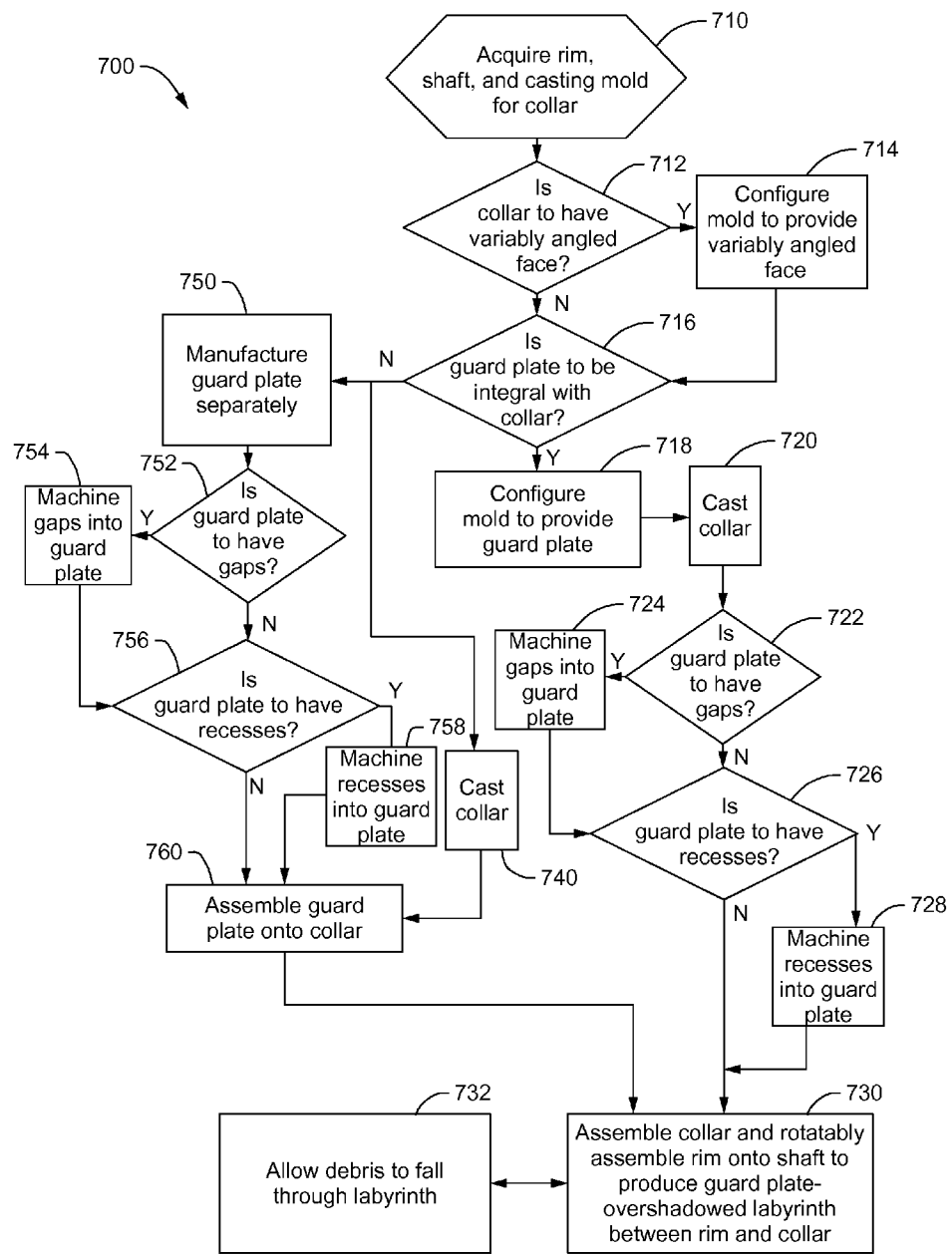
FIG. 7 is a flow diagram of a method to assemble and use the undercarriage track roller of the machine, in accordance with an embodiment of the present disclosure.

FIG. 7 is a flow diagram showing a method 700 of preventing debris packing in an undercarriage track roller. More specifically, at stage 710, preparations may be made to begin the method 700 by acquiring a rim, a shaft, and a casting mold for a collar. At stage 712, a decision may be made as to whether the collar is to have a variably angled face. If this is the case, the casting mold may be configured to provide the variably angled face at stage 714 and the method 700 may progress to another decision at stage 716. However, if at stage 712 the collar is not to have a variably angled face, the method may bypass stage 714 and move directly to the decision of stage 716.

At stage 716, a decision may be made as to whether the guard plate is to be integral with the collar. If this is the case, the casting mold may be configured to provide the guard plate at stage 718 and the method 700 may progress to stage 720 where the collar may be cast and then to another decision at stage 722. However, if at stage 716, the collar is not to be integral with the guard plate, the method 700 may split to progress to stages 740 and 750 where the collar may be cast and the guard plate may be manufactured separately, respectively.

After the guard plate has been manufactured at stage 750, the method 700 may move along to a decision at stage 752 as to whether the guard plate is to have gaps. If this is the case, gaps may be machined into the guard plate at stage 754. If this is not the case, the method 700 may bypass stage 754 and progress to another decision at stage 756.

At stage 756, a decision may be made as to whether the guard plate is to have recesses. If this is the case, recesses may be machined into the guard plate at stage 758 and the guard plate may then be assembled onto the cast collar at stage 760. However, if the guard plate is not to have recesses, the method 700 may bypass stage 758 and move directly to the assembly at stage 760.

Returning to stage 722, a decision may be made as to whether the guard plate integral with the collar is to have gaps. If this is the case, gaps may be machined into the guard plate at stage 724. If not, the method 700 may bypass the machining of stage 724 and advance to another decision at stage 726.

At stage 726, a decision may be made as to whether the guard plate integral with the collar is to have recesses. If yes, recesses may be machined into the guard plate at stage 728. If no, the method 700 may skip the machining of stage 728.

From stages 726, 728, and 760 (i.e., once the collar has been cast and the guard plate has been produced), the method 700 may progress toward stage 730 where the collar and the rim may be assembled onto the shaft, the rim rotatably so, to produce a labyrinth between the rim and the collar that is at least partially overshadowed by the guard plate. After the assembly of stage 730, debris may be allowed to fall through the labyrinth at stage 732 when, as a non-exhaustive example, the undercarriage track roller is installed in a machine and used on a work site.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. An undercarriage track roller, comprising:
   a shaft;
   at least one collar operatively associated with the shaft, the collar having a top portion and a bottom portion;
   a guard plate operatively associated with the collar;
   at least one rim rotatably associated with the shaft and interfacing with the collar;
   a labyrinth formed between the collar and the rim, the labyrinth being at least partially overshadowed by the guard plate; and
   a variably angled face disposed on the collar, the variably angled face interfacing with the rim and forming the labyrinth between the collar and the rim, wherein the variably angled face of the collar is closer to the rim along the top portion of the collar and further from the rim along the bottom portion of the collar such that the labyrinth is larger along the bottom portion of the collar than the top portion of the collar to allow particles of debris to escape through the labyrinth.

2. The undercarriage track roller of claim 1, wherein the guard plate includes a solid upper portion along the top portion of the collar and includes at least one recess along a lower portion of the guard plate on an inner face of the guard plate interfacing with the rim.

3. The undercarriage track roller of claim 1, wherein the guard plate includes a solid upper portion along the top portion of the collar and has at least one gap along a lower portion of the guard plate.

4. The undercarriage track roller of claim 1, wherein the guard plate is integral with the collar.

5. A machine, comprising:
a chassis;
at least one continuous track supporting the chassis;
an undercarriage including at least one undercarriage track roller configured to support and guide the at least one continuous track, the at least one undercarriage track roller including;
a shaft;
at least one collar operatively associated with the shaft, the collar having a top portion and a bottom portion;
a guard plate operatively associated with the collar;
at least one rim rotatably associated with the shaft and interfacing with the collar;
a labyrinth formed between the collar and the rim, the labyrinth being at least partially overshadowed by the guard plate; and
a variably angled face disposed on the collar, the variably angled face interfacing with the rim and forming the labyrinth between the collar and the rim, wherein the variably angled face of the collar is closer to the rim along the top portion of the collar and further from the rim along the bottom portion of the collar such that the labyrinth is larger along the bottom portion of the collar than the top portion of the collar to allow particles of debris to escape through the labyrinth.

6. The machine of claim 5, wherein the guard plate is integral with the collar.

7. The machine of claim 5, wherein the guard plate is annular.

8. The machine of claim 5, wherein the guard plate has at least one void.

9. The machine of claim 8, wherein the void is a recess along an inner face of the guard plate and the inner face interfaces with the rim.

10. The machine of claim 9, wherein the recess is disposed on a lower portion of the guard plate.

11. The machine of claim 8, wherein the void is a gap.

12. The machine of claim 11, wherein the gap is disposed on a lower portion of the guard plate.

13. The machine of claim 5, wherein the guard plate has at least one recess and at least one gap.

14. An undercarriage track roller, comprising:
a shaft;
at least one collar operatively associated with the shaft, the collar having a top portion and a bottom portion;
at least one rim rotatably associated with the shaft and interfacing with the collar;
an annular guard plate operatively associated with the collar, the guard plate including an inner face which interfaces with the rim;
a labyrinth formed between the collar and the rim, the labyrinth being at least partially overshadowed by the guard plate;
a variably angled face disposed on the collar, the variably angled face interfacing with the rim and forming the labyrinth between the collar and the rim, wherein the variably angled face of the collar is closer to the rim along the top portion of the collar and further from the rim along the bottom portion of the collar such that the labyrinth is larger along the bottom portion of the collar than the top portion of the collar to allow particles of debris to escape through the labyrinth; and
wherein the guard plate includes a solid upper portion along the top portion of the collar and wherein a lower portion of the guard plate includes one or more voids, the one or more voids configured to allow particles of debris to escape the undercarriage track roller after falling through the labyrinth.

15. The undercarriage track roller of claim 14, wherein the one or more voids include one or more of at least one recess bounded within the inner face of the guard plate interfacing with the rim and at least one gap formed through the guard plate.

16. The undercarriage track roller of claim 14, wherein the one or more voids are along an outer perimeter of the guard plate.

17. The undercarriage track roller of claim 16, wherein the one or more voids include at least one gap formed through the guard plate.

* * * * *